US010622849B2

(12) United States Patent
Hosoda

(10) Patent No.: US 10,622,849 B2
(45) Date of Patent: Apr. 14, 2020

(54) STATOR, BLOCK OF STATOR, AND ROTARY ELECTRICAL MACHINE

(71) Applicant: FANUC CORPORATION, Yamanashi (JP)

(72) Inventor: Akihiro Hosoda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/190,678

(22) Filed: Nov. 14, 2018

(65) Prior Publication Data

US 2019/0148997 A1    May 16, 2019

(30) Foreign Application Priority Data

Nov. 15, 2017 (JP) .................................. 2017-219655

(51) Int. Cl.
*H02K 1/14* (2006.01)
*H02K 21/16* (2006.01)
*H02K 29/03* (2006.01)
*H02K 1/27* (2006.01)

(52) U.S. Cl.
CPC ............ *H02K 1/146* (2013.01); *H02K 21/16* (2013.01); *H02K 1/2766* (2013.01); *H02K 29/03* (2013.01); *H02K 2201/09* (2013.01); *H02K 2213/03* (2013.01)

(58) Field of Classification Search
CPC .. H02K 1/12; H02K 1/16; H02K 1/18; H02K 1/185; H02K 5/024; H02K 5/026; H02K 5/028; H02K 2201/09
USPC ........... 310/216.004, 8, 9, 44, 48, 49, 51, 52
See application file for complete search history.

(56) References Cited

U.S. PATENT DOCUMENTS

| 4,160,182 | A  | * | 7/1979 | Mitsui ................... H02K 3/493 310/214 |
| 2004/0056556 | A1 | * | 3/2004 | Fujita ...................... H02K 1/06 310/216.044 |
| 2009/0072655 | A1 | * | 3/2009 | Sano ...................... H02K 1/185 310/216.016 |

(Continued)

FOREIGN PATENT DOCUMENTS

| JP | 11-098793 A | 4/1999 |
| JP | 2000037051 A | 2/2000 |

(Continued)

OTHER PUBLICATIONS

Notice of Reasons for Refusal issued by the Japanese Patent Office in relation to Japanese Patent Application No. 2017-219655 dated Jul. 16, 2019 (4 pages) along with English language translation (6 pages).

(Continued)

*Primary Examiner* — Tran N Nguyen
*Assistant Examiner* — Minki Chang
(74) *Attorney, Agent, or Firm* — Robert P. Michal, Esq.; Carter, DeLuca & Farrell LLP

(57) ABSTRACT

A stator includes blocks formed by integrating laminated steel plates by crimping. The stator is formed by overlaying a plurality of the blocks in an axial direction of the stator, and is formed such that in a plane that a pair of the blocks face each other, at least one crimping position of one of the blocks and a crimping position of the other of the blocks do not overlap with each other, when the stator is viewed from the axial direction.

3 Claims, 8 Drawing Sheets

(56) References Cited

U.S. PATENT DOCUMENTS

2011/0148246 A1* 6/2011 Mizutani ................. H02K 1/16
310/216.009

FOREIGN PATENT DOCUMENTS

| | | | |
|---|---|---|---|
| JP | 2001128396 A | 5/2001 |
| JP | 2001-258225 A | 9/2001 |
| JP | 2002-272024 A | 9/2002 |
| JP | 2003180043 A | 6/2003 |
| JP | 2006230087 A | 8/2006 |
| JP | 2010-142067 A | 6/2010 |
| JP | 2016082627 A | 5/2016 |
| JP | 2016226170 A | 12/2016 |

OTHER PUBLICATIONS

Decision to Grant a Patent issued by the Japanese Patent Office in relation to Japanese Patent Application No. 2017-219655 dated Nov. 12, 2019 (3 pages) along with English language translation (3 pages).

* cited by examiner

US 10,622,849 B2

STATOR, BLOCK OF STATOR, AND ROTARY ELECTRICAL MACHINE

CROSS-REFERENCE TO RELATED APPLICATION

This application is based upon and claims the benefit of priority from Japanese Patent Application No. 2017-219655 filed on Nov. 15, 2017, the contents of which are incorporated herein by reference.

BACKGROUND OF THE INVENTION

Field of the Invention

The present invention relates to a stator formed by laminated steel plates, a block of the stator formed by the laminated steel plates, and a rotary electrical machine including the stator formed by the laminated steel plates.

Description of the Related Art

Japanese Laid-Open Patent Publication No. 2010-142067 discloses a stator core formed by laminating magnetic steel plates and carrying out a crimping processing on the magnetic steel plates to join the magnetic steel plates.

SUMMARY OF THE INVENTION

In the technology of Japanese Laid-Open Patent Publication No. 2010-142067, there has been a problem that a place where the crimping processing of the magnetic steel plates has been performed partially deforms, hence an ease of flow of a magnetic field at the place where the crimping processing has been performed and an ease of flow of a magnetic field at a place where the crimping processing has not been performed differ, and a cogging torque increases.

The present invention has been made to solve the above-described problem, and has an object of providing a stator, a block of the stator, and a rotary electrical machine that enable a cogging torque to be reduced.

A first aspect of the present invention is a stator including blocks formed by integrating laminated steel plates by crimping. The stator is formed by overlaying a plurality of the blocks in an axial direction of the stator, and the stator is formed such that in a plane that a pair of the blocks face each other, at least one crimping position of one of the blocks and a crimping position of the other of the blocks do not overlap with each other, when the stator is viewed from the axial direction.

A second aspect of the present invention is a block of a stator formed by integrating laminated steel plates by crimping. The block is formed such that a crimping position is offset with respect to a symmetry line of a shape of the block when the block is viewed from an axial direction of the stator.

A third aspect of the present invention is a stator including the above-described block of the stator. The stator is formed by inverting one of the blocks with respect to another of the blocks and thereafter overlaying a plurality of the blocks in the axial direction.

A fourth aspect of the present invention is a rotary electrical machine including the above-described stator.

The present invention makes it possible for a cogging torque to be reduced.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

First Embodiment

[Configuration of Rotary Electrical Machine]

Figure 1:
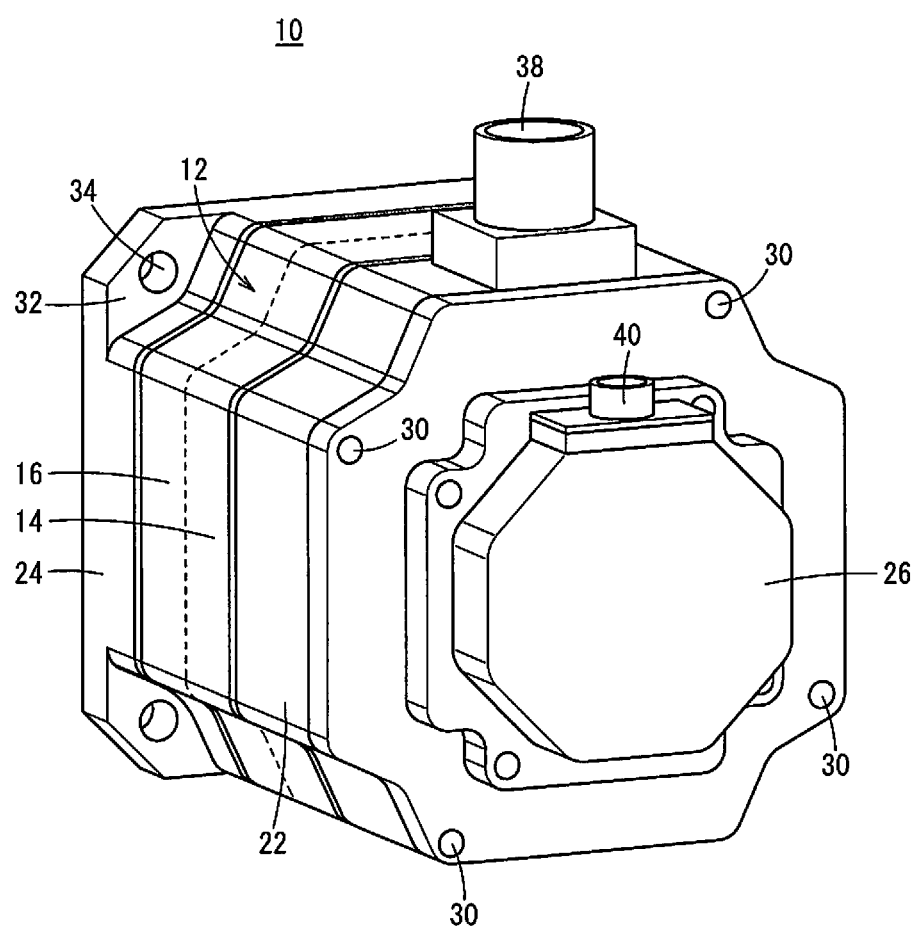
FIG. 1 is a perspective view showing an outward appearance of a rotary electrical machine.
Figure 2:
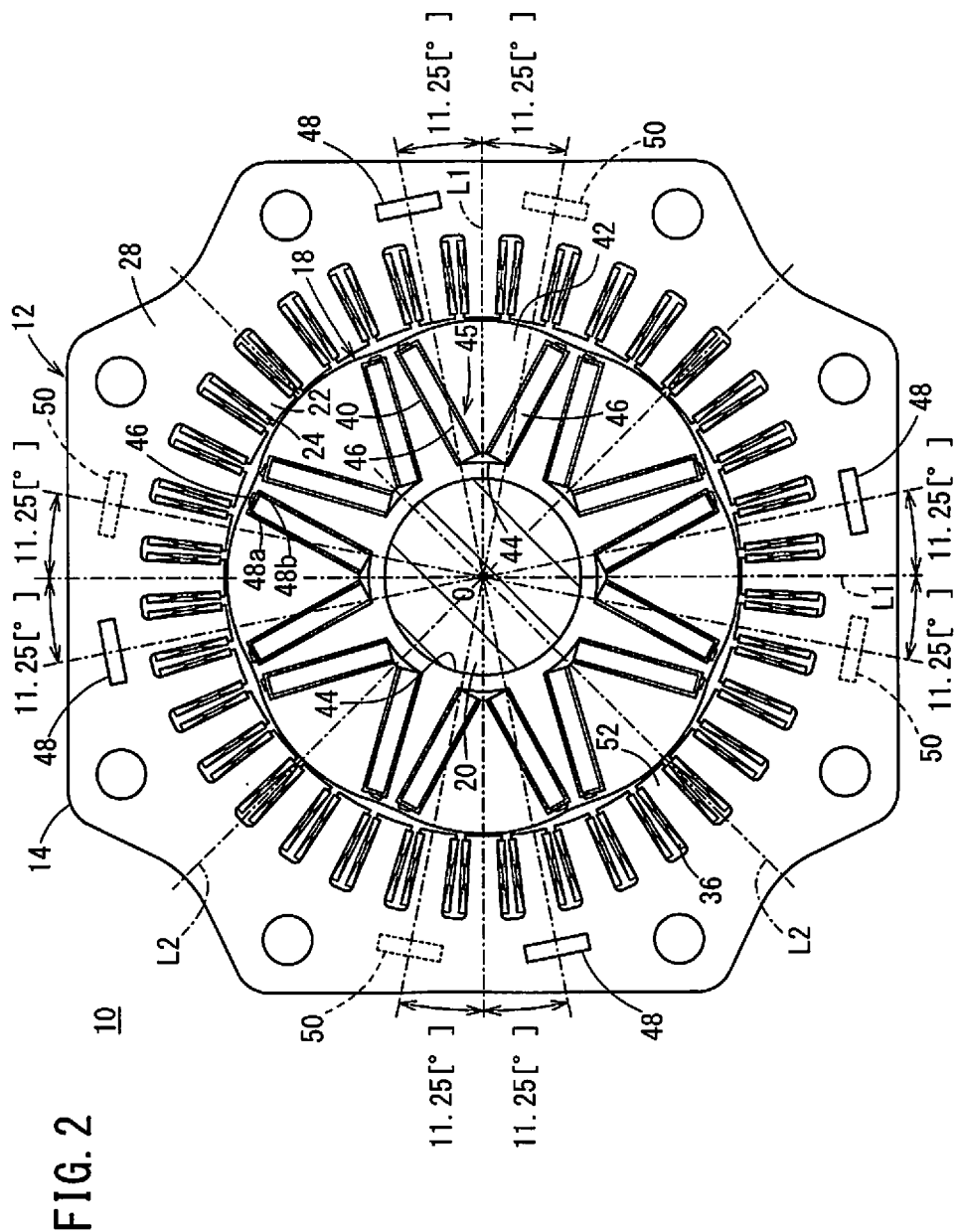
FIG. 2 is a cross-sectional view of the rotary electrical machine.

FIG. 1 is a perspective view showing an outward appearance of a rotary electrical machine 10. FIG. 2 is a cross-sectional view in which the rotary electrical machine 10 has been cut in a plane perpendicular to a rotary axis O of the rotary electrical machine 10, between a first block 14 and a second block 16 of a stator 12. The rotary electrical machine 10 includes the stator 12, a rotor 18, a shaft 20, a first housing 22, a second housing 24, and a bearing holder 26.

The stator 12 includes a stator core 28 configured by the two blocks, that is, the first block 14 and the second block 16 overlaid (stacked) on each other in the direction of the rotary axis O (which will be also referred to as a rotary axis O direction) of the rotary electrical machine 10. The first housing 22 is attached to a side at one end of the stator 12 in the rotary axis O direction, and the second housing 24 is attached to a side at the other end of the stator 12 in the rotary axis O direction. The bearing holder 26 is attached to a side at the one end of the first housing 22 in the rotary axis O direction. The stator 12, the shaft 20, the first housing 22, the second housing 24, and the bearing holder 26 are fastened by tie rods 30 that extend in the rotary axis O direction.

The shaft 20 is supported in a rotatable manner by an unillustrated bearing provided straddling the bearing holder 26 and the first housing 22 and an unillustrated bearing provided to the second housing 24. The shaft 20 penetrates the first housing 22, the stator 12, and the second housing 24, and the other end portion of the shaft 20 projects from the second housing 24.

Flanges 32 are formed in the four corners of the second housing 24, and the flanges 32 have respective bolt holes 34 in which bolts are inserted when the rotary electrical machine 10 is attached to an apparatus or the like. The first housing 22 is provided with a first connector 38 for supplying electric power to a coil 36 of the stator 12. The bearing holder 26 is provided with a second connector 40 for outputting, to outside, a signal of an unillustrated rotation angle sensor that detects a rotation angle, a rotational speed, and so on, of the rotor 18.

The rotor 18 includes a rotor core 42 of a substantially circular columnar shape and which is made of a laminated steel plate formed by laminating thin steel plates in the rotary axis O direction. The rotor core 42 has formed therein a shaft insertion hole 44 that penetrates therethrough along the rotary axis O of the rotor core 42. The shaft 20 is inserted by shrink fitting, in the shaft insertion hole 44. As a result, the rotor core 42 rotates integrally with the shaft 20.

The rotor core 42 has formed therein eight slots 45 that penetrate in the rotary axis O direction. The slot 45 is disposed in a V shape whose outer circumferential side separates when the rotor core 42 is viewed from the rotary axis O direction. Two permanent magnets 46 are inserted in each of the slots 45. The two permanent magnets 46 are disposed such that their poles on an inner side of the V-shaped slot 45 are the same. Furthermore, the permanent magnets 46 are disposed such that poles on the inner side of the V-shaped slot 45 of the permanent magnets 46 inserted in adjacent slots 45 are opposite. In other words, the number of poles of the rotor 18 is eight.

The first block 14 and the second block 16 making up the stator core 28 are made of laminated steel plates formed by laminating thin steel plates in the rotary axis O direction. The first block 14 and the second block 16 are formed in the same shape. The first block 14 and the second block 16 are formed in a shape having line symmetry with respect to symmetry axes L1 and symmetry axes L2 as straight lines passing through the rotary axis O when each of the first block 14 and the second block 16 is viewed from the rotary axis O direction. Due to the first block 14 and the second block 16 having the same shape, the steel plates making up the first block 14 and the second block 16 can be punched by the same die.

The first block 14 is integrally formed by being crimped (swaged) at four crimping positions 48, and the second block 16 is integrally formed by being crimped at four crimping positions 50. The crimping position 48 of the first block 14 is formed at a position where a central position of the crimping position 48 in a width direction of the crimping position 48 has been offset by substantially 11.25 [°] with respect to the symmetry axis L1 of the shape of the first block 14, when the first block 14 is viewed from the rotary axis O direction. The four crimping positions are all formed offset in one direction with respect to the symmetry axis L1.

The crimping position 50 of the second block 16 is also formed in a similar position to that of the first block 14. Note that although in the above description, a configuration has been adopted whereby central positions in the width direction of the crimping position 48 and the crimping position 50 are formed at positions offset by substantially 11.25 [°] with respect to the symmetry axis L1, a configuration may be adopted whereby they are formed at positions offset by substantially 11.25 [°] with respect to the symmetry axis L2.

At a time when the first block 14 and the second block 16 are overlaid, in a state where the first block 14 and the second block 16 are arranged such that the crimping position 48 and the crimping position 50 are positioned on the same side with respect to the symmetry axis L1 when the first block 14 and the second block 16 are viewed from the rotary axis O direction, the second block 16 is overlaid on the first block 14 after first having been inverted.

As a result, when the stator 12 is viewed from the rotary axis O direction in a state where the first block 14 and the second block 16 have been overlaid, the central position in the width direction of the crimping position 48 of the first block 14 and the central position in the width direction of the crimping position 50 of the second block 16 are in a state of being offset by substantially 22.5 [°] to each other. An offset amount of the crimping position 48 of the first block 14 and the crimping position 50 of the second block 16 is set according to the number of poles of the rotor 18, and the offset amount when the number of poles is assumed to be n, is 360/2n [°].

The first block 14 and the second block 16 each include, in a circumferential direction, 36 teeth 52 that project to an inner circumferential side, and each of the teeth 52 has the coil 36 wound thereon. In other words, the number of slots of the stator 12 is 36.

[Reduction of Cogging Torque]

Due to the first block 14 and the second block 16 being crimped, the steel plates of the first block 14 and the second block 16 partially deform. Therefore, an ease of flow of a magnetic field at a place where crimping has been performed and an ease of flow of a magnetic field at a place where crimping has not been performed differ, and a cogging torque increases. In the present embodiment, a cogging torque generated between the first block 14 and the rotor 18 and a cogging torque generated between the second block 16 and the rotor 18 are canceled out with each other, thereby reducing a cogging torque of the rotary electrical machine 10.

Figure 3A:
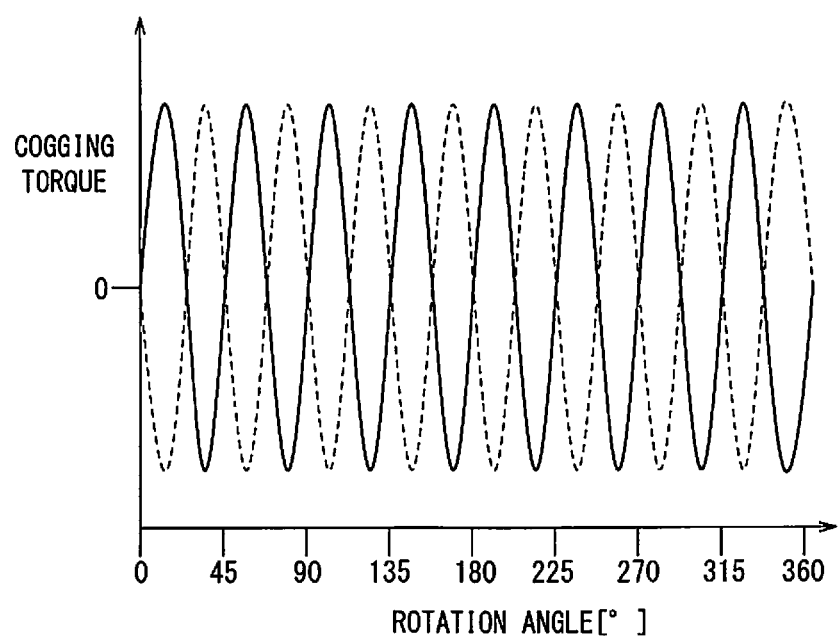
FIGS. 3A and 3B are graphs showing simulation results of a cogging torque generated in the rotary electrical machine when a crimping position of a first block and a crimping position of a second block have been offset by 22.5 [°]
Figure 3B:
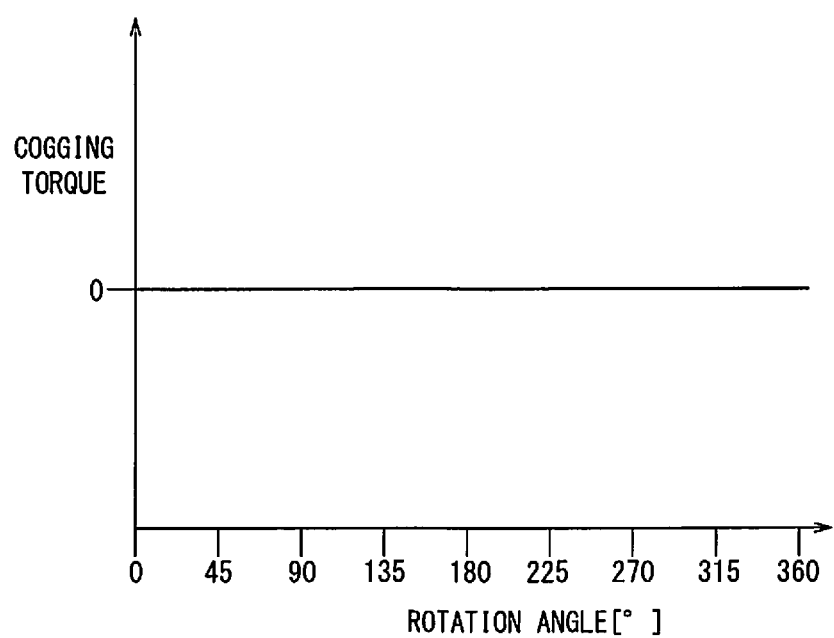

FIGS. 3A and 3B are graphs showing simulation results of the cogging torque generated between the first block 14 and the rotor 18 and the cogging torque generated between the second block 16 and the rotor 18. In the graph of FIG. 3A, the cogging torque generated between the first block 14 and the rotor 18 is shown by a solid line, and the cogging torque generated between the second block 16 and the rotor 18 is shown by a dotted line. FIG. 3B is a graph obtained by superposition of the cogging torque generated between the first block 14 and the rotor 18 and the cogging torque generated between the second block 16 and the rotor 18.

In the rotor 18 whose number of poles is eight, as shown in FIGS. 3A and 3B, by the crimping position 48 of the first block 14 and the crimping position 50 of the second block 16 being offset by 22.5 [°], the cogging torque generated between the first block 14 and the rotor 18 and the cogging torque generated between the second block 16 and the rotor 18 can be completely canceled out.

Figure 4A:
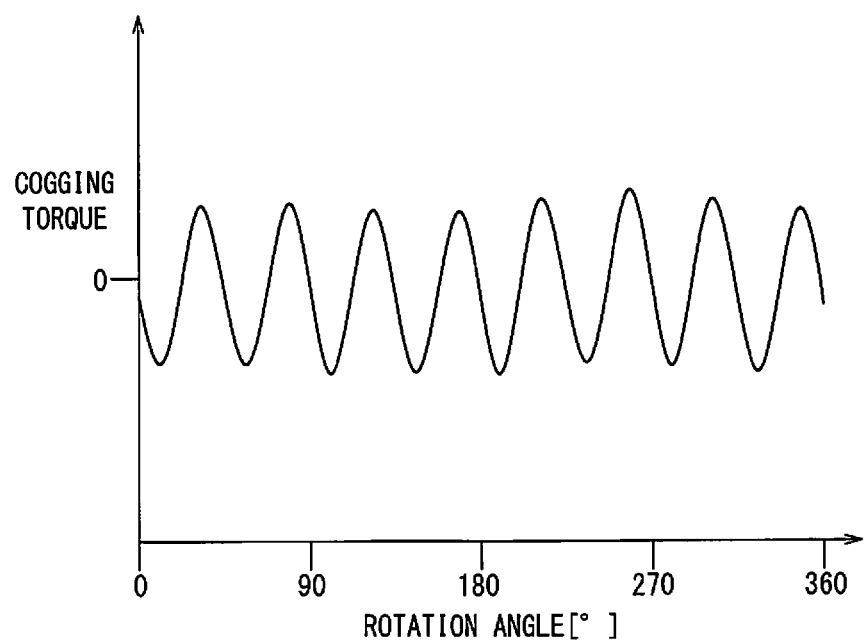
FIGS. 4A and 4B are graphs showing measured values of the cogging torque generated in the rotary electrical machine when the crimping position of the first block and the crimping position of the second block have been offset by 22.5 [°]
Figure 4B:
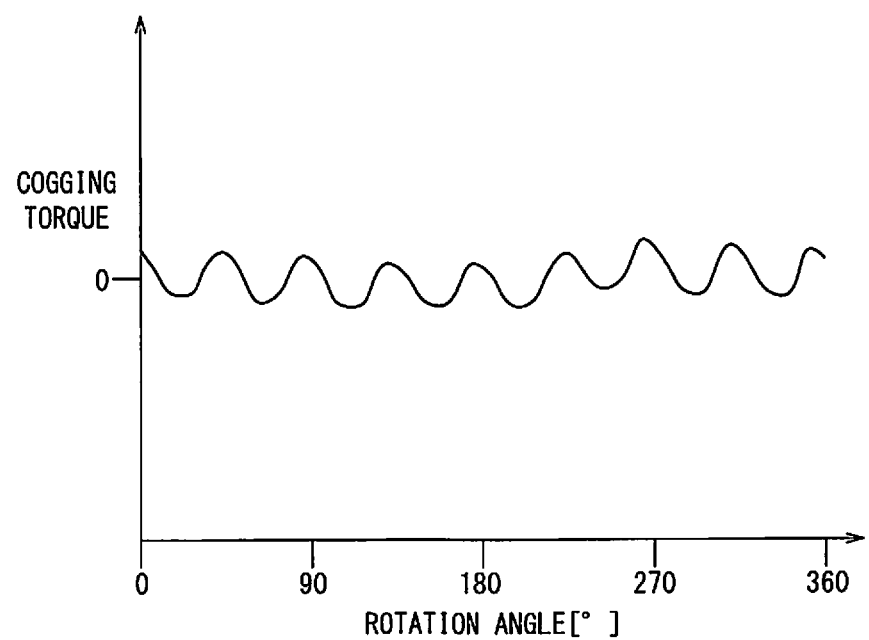

FIGS. 4A and 4B are graphs showing measured values of the cogging torque generated in the rotary electrical machine 10. FIG. 4A is a graph showing the cogging torque generated in the rotary electrical machine 10 when the crimping position 48 of the first block 14 and the crimping position 50 of the second block 16 are not offset. FIG. 4B is a graph showing the cogging torque generated in the rotary electrical machine 10 when the crimping position 48 of the first block 14 and the crimping position 50 of the second block 16 are offset by 22.5 [°].

As shown in FIGS. 4A and 4B, the cogging torque is found to be reduced more when the crimping position 48 of the first block 14 and the crimping position 50 of the second block 16 are offset by 22.5 [°], compared to when the crimping position 48 of the first block 14 and the crimping position 50 of the second block 16 are not offset. Note that although, judging by FIG. 4B, cogging torque is still being generated in the rotary electrical machine 10, this is a cogging torque generated due to the likes of magnetic anisotropy of the rotor 18.

Note that although the above description has mentioned the case where the crimping position 48 of the first block 14 and the crimping position 50 of the second block 16 are offset by substantially 22.5 [°], the offset amount is not limited to being 22.5 [°], and all that is required is to configure such that the crimping position 48 of the first block 14 and the crimping position 50 of the second block 16 do not overlap with each other.

Figure 5A:
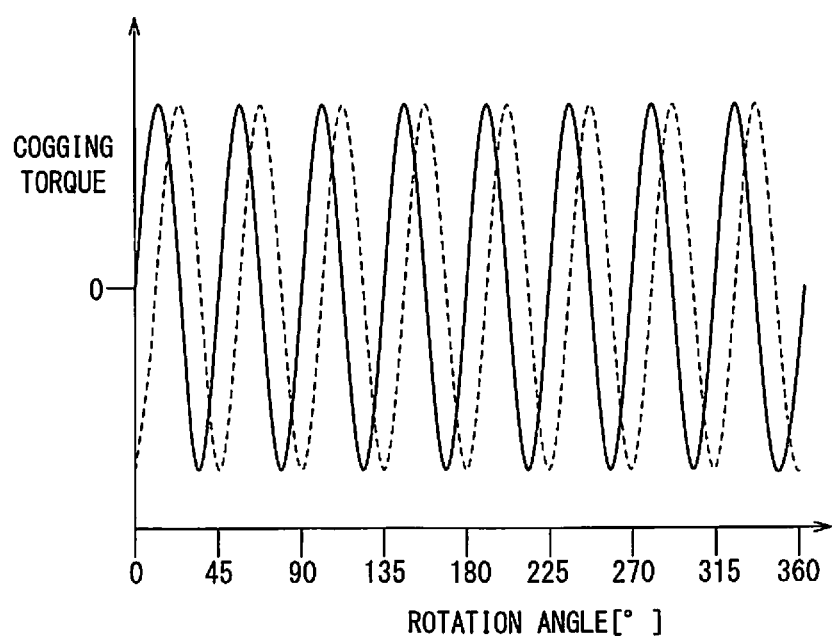
FIGS. 5A and 5B are graphs showing simulation results of the cogging torque generated in the rotary electrical machine when the crimping position of the first block and the crimping position of the second block have been offset by 10 [°]
Figure 5B:
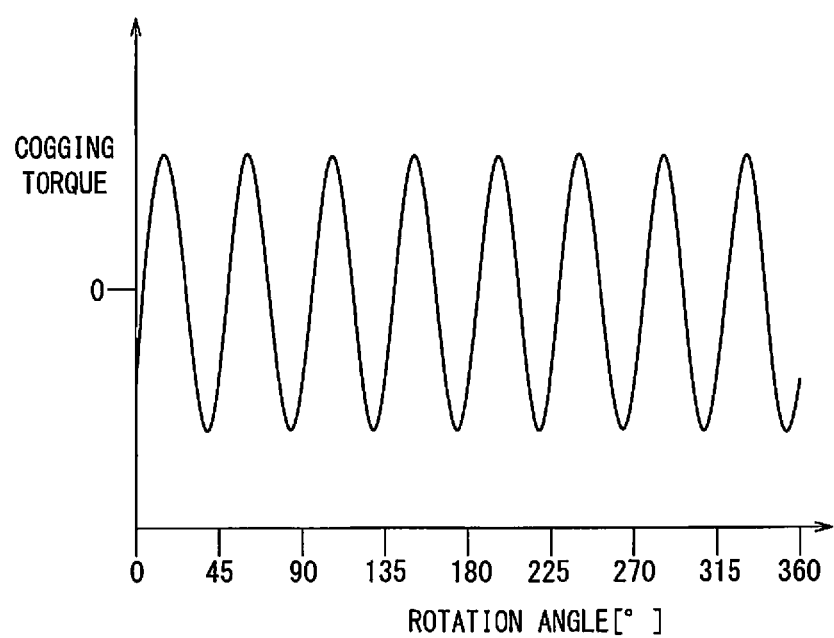

FIGS. 5A and 5B are graphs showing simulation results of the cogging torque generated in the rotary electrical machine 10 when the crimping position 48 of the first block 14 and the crimping position 50 of the second block 16 are offset by 10 [°]. FIG. 5A is a graph showing the cogging torque generated between the first block 14 and the rotor 18 and the cogging torque generated between the second block 16 and the rotor 18. In the graph of FIG. 5A, the cogging torque generated between the first block 14 and the rotor 18 is shown by a solid line, and the cogging torque generated between the second block 16 and the rotor 18 is shown by a dotted line. FIG. 5B is a graph obtained by superposition of the cogging torque generated between the first block 14 and the rotor 18 and the cogging torque generated between the second block 16 and the rotor 18.

Figure 6A:
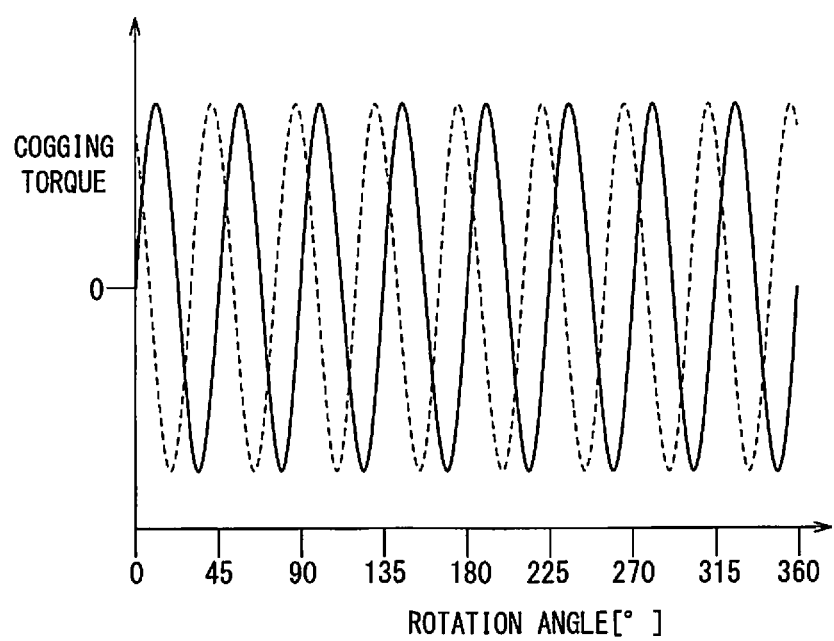
FIGS. 6A and 6B are graphs showing simulation results of the cogging torque generated in the rotary electrical machine when the crimping position of the first block and the crimping position of the second block have been offset by 30 [°]
Figure 6B:
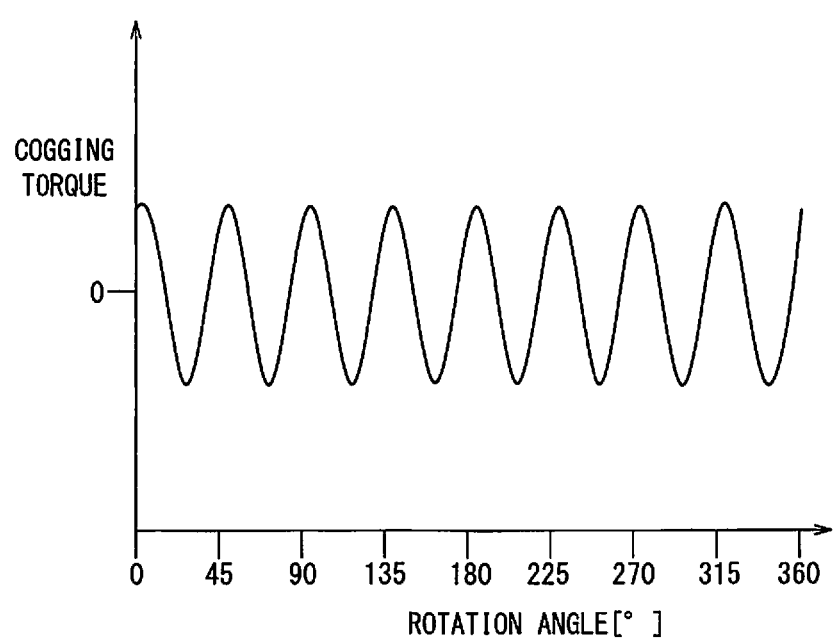

FIGS. 6A and 6B are graphs showing the cogging torque generated in the rotary electrical machine 10 when the crimping position 48 of the first block 14 and the crimping position 50 of the second block 16 are offset by 30 [°].

FIG. 6A is a graph showing the cogging torque generated between the first block 14 and the rotor 18 and the cogging torque generated between the second block 16 and the rotor 18. In the graph of FIG. 6A, the cogging torque generated between the first block 14 and the rotor 18 is shown by a solid line, and the cogging torque generated between the second block 16 and the rotor 18 is shown by a dotted line. FIG. 6B is a graph obtained by superposition of the cogging torque generated between the first block 14 and the rotor 18 and the cogging torque generated between the second block 16 and the rotor 18.

It is found from FIGS. 5A, 5B, 6A, and 6B that if the crimping position 48 of the first block 14 and the crimping position 50 of the second block 16 are offset, the cogging torque of the rotary electrical machine 10 can be reduced.

Second Embodiment

Figure 7:
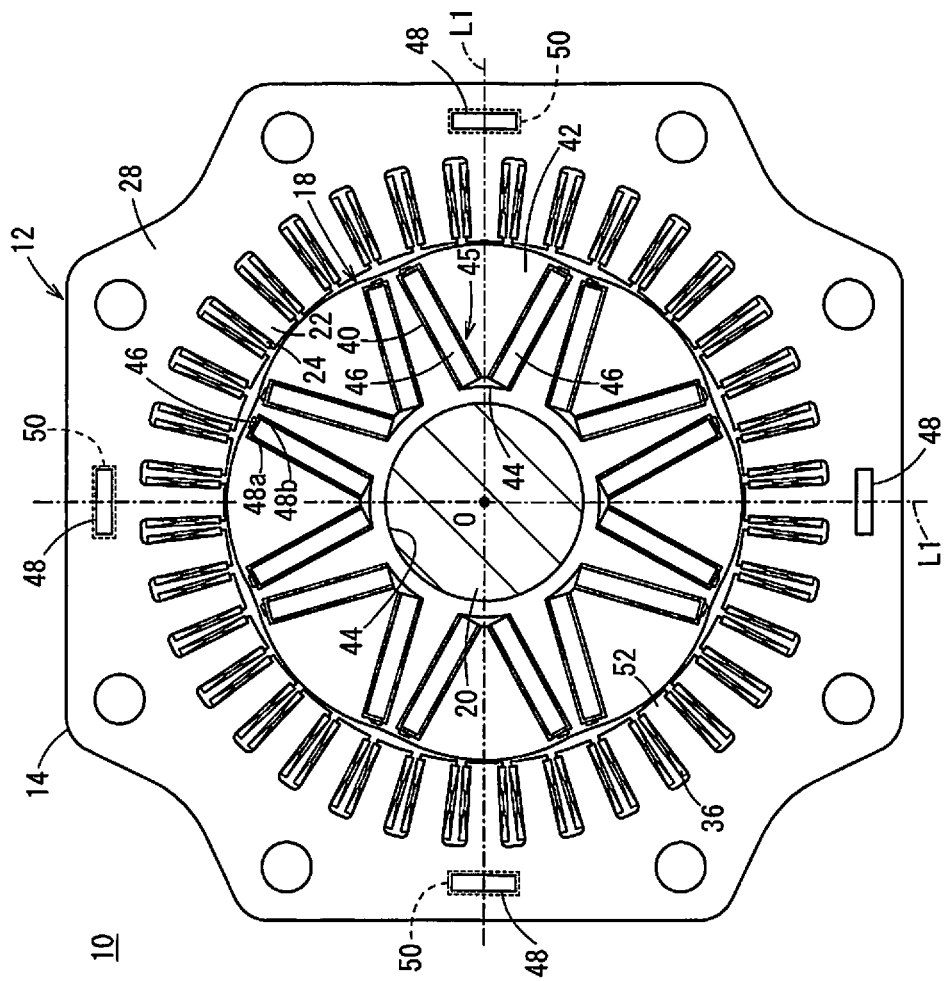
FIG. 7 is a cross-sectional view of the rotary electrical machine.

In a second embodiment, the rotary electrical machine 10 is formed such that the number of crimping positions 48 of the first block 14 and the number of crimping positions 50 of the second block 16 differ. FIG. 7 is a cross-sectional view in which the rotary electrical machine 10 has been cut in a plane perpendicular to the rotary axis O of the rotary electrical machine 10, between the first block 14 and the second block 16 of the stator 12.

The first block 14 is integrally formed by being crimped at four crimping positions 48, and the second block 16 is integrally formed by being crimped at three crimping positions 50. In other words, contrary to the first embodiment, the first block 14 and the second block 16 are not formed in the same shape, their number of crimping positions 48 and number of crimping positions 50 not being matched. Due to the second block 16 being overlaid on the first block 14, three crimping positions 48 of the four crimping positions 48 of the first block 14 and the three crimping positions 50 of the second block 16 overlap when the stator 12 is viewed from the rotary axis O direction. In the second embodiment, there is no need for the second block 16 to be inverted before being overlaid on the first block 14 as in the first embodiment.

By configuring such that, of the crimping positions 48 of the first block 14 and the crimping positions 50 of the second block 16, at least one crimping position of one of these does not overlap a crimping position of the other of these, the cogging torque generated between the first block 14 and the rotor 18 and the cogging torque generated between the second block 16 and the rotor 18 can be canceled out with each other, and the cogging torque generated in the rotary electrical machine 10 can be reduced. If the first block 14 and the second block 16 are formed such that the number of crimping positions 48 of the first block 14 and the number of crimping positions 50 of the second block 16 differ as in the second embodiment, then at least one crimping position 48 of the crimping positions 48 of the first block 14 does not overlap a crimping position 50 of the second block 16.

Modified Example 1

Figure 8:
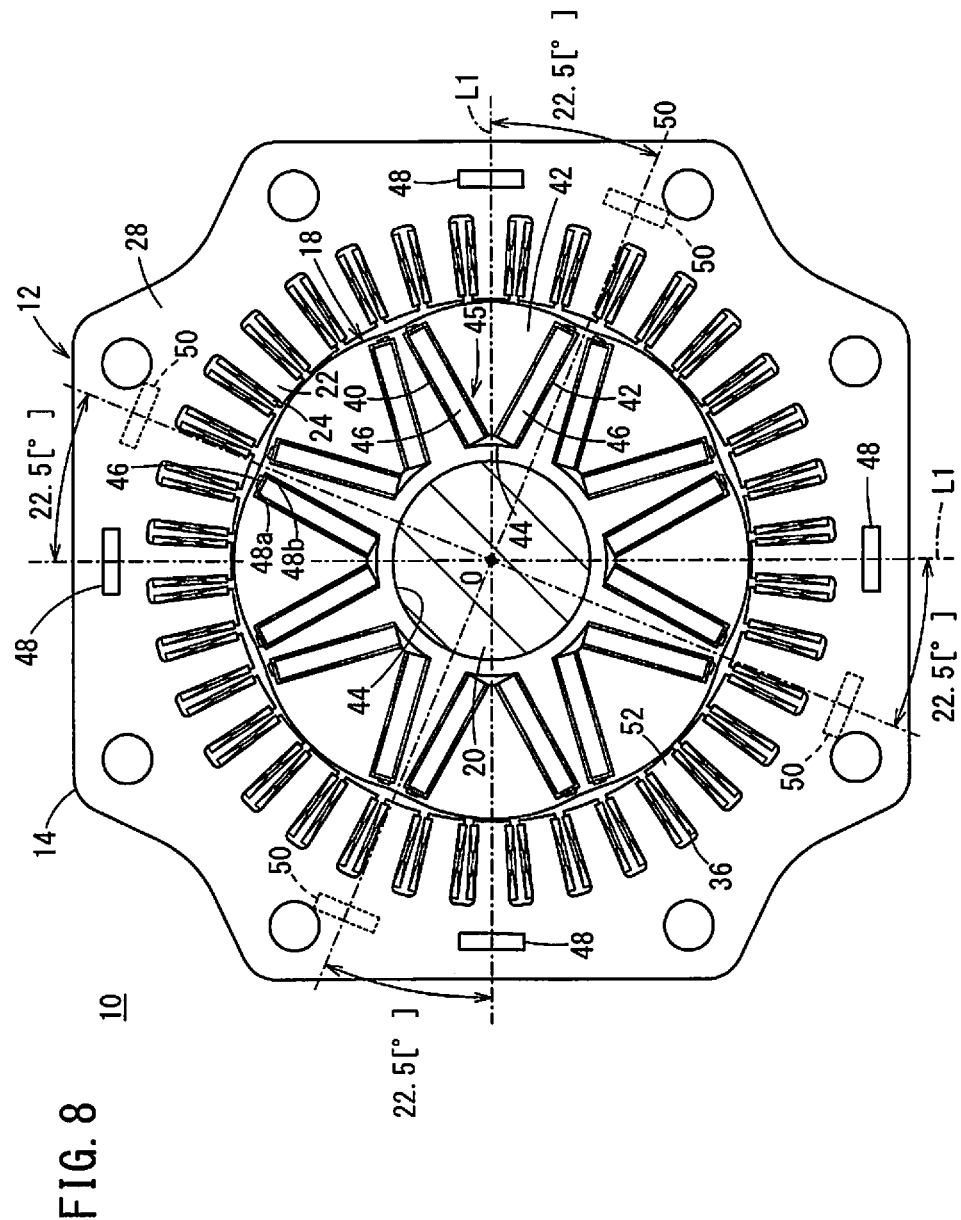
FIG. 8 is a cross-sectional view of the rotary electrical machine.

FIG. 8 is a cross-sectional view in which the rotary electrical machine 10 has been cut in a plane perpendicular to the rotary axis O of the rotary electrical machine 10, between the first block 14 and the second block 16 of the stator 12.

In the first embodiment, a configuration was adopted whereby the crimping position 48 of the first block 14 and the crimping position 50 of the second block 16 were formed at positions where the central positions in the width direction of the crimping position 48 and the crimping position 50 were offset with respect to the symmetry axis L1 of the shapes of the first block 14 and the second block 16, when the first block 14 and the second block 16 were viewed from the rotary axis O direction (FIG. 2).

In contrast, a configuration may be adopted whereby the crimping position 48 of the first block 14 is formed at a position where the central position in the width direction of the crimping position 48 coincides with the symmetry axis L1 of the shape of the first block 14, when the first block 14 is viewed from the rotary axis O direction. In this case, a configuration should be adopted whereby the crimping position 50 of the second block 16 is formed at a position where the central position in the width direction of the crimping position 50 is offset by substantially 22.5 [°] with respect to the symmetry axis L1 of the shape of the second block 16, when the second block 16 is viewed from the rotary axis O direction.

Modified Example 2

It is only required to configure such that, of the crimping positions 48 of the first block 14 and the crimping positions 50 of the second block 16, at least one crimping position of one of these does not overlap a crimping position of the other of these, without being limited to the shapes of the first block 14 and the second block 16 in the first embodiment and the second embodiment.

Modified Example 3

Although in the first embodiment and the second embodiment, a configuration was adopted whereby the stator core 28 was formed by overlapping two blocks, that is, the first block 14 and the second block 16, in the rotary axis O direction, a configuration may be adopted whereby the stator core 28 is formed by overlapping three or more blocks in the rotary axis O direction.

Note that shapes of the stator 12 or rotor 18 of the rotary electrical machine 10 are not limited to the shapes shown in the above-described first embodiment, second embodiment, and modified examples 1-3. The cogging torque generated in the rotary electrical machine 10 can be reduced, provided the rotary electrical machine 10 is formed such that in a plane that a pair of the first block 14 and the second block 16 face each other, at least one crimping position 48 of the first block 14 and a crimping position 50 of the second block 16 do not overlap, when the stator 12 is viewed from the axial direction.

Technical Concepts Obtained from Embodiments

Technical concepts understandable from the above-described embodiments will be described below.

In a stator (12) made up of blocks (14, 16) formed by integrating laminated steel plates by crimping, the stator (12) is formed by overlaying a plurality of the blocks (14, 16) in an axial direction of the stator (12), and the stator (12) is formed such that in a plane that a pair of the blocks (14, 16) face each other, at least one crimping position (48) of one of the blocks (14) and a crimping position (50) of the other of the blocks (16) do not overlap with each other, when the stator (12) is viewed from the axial direction. As a result, a cogging torque generated between the block (14) and a rotor (18) and a cogging torque generated between the block (16) and the rotor (18) are canceled out with each other, whereby a cogging torque of a rotary electrical machine (10) overall can be reduced.

In the above-described stator (12), the number of the crimping positions (48) formed in one of the blocks (14) may be equal to the number of crimping positions (50) formed in another of the blocks (16), and the stator (12) may be formed such that in a plane that a pair of the blocks (14, 16) face each other, and when the number of magnetic poles of a rotor (18) is assumed to be n, the crimping position (48) of the one of the blocks (14) is offset by 360/2n [°] around a rotary axis of the rotor (18) with respect to the crimping position (50) of the other of the blocks (16), when the stator (12) is viewed from the axial direction. As a result, the cogging torque generated between the block (14) and the rotor (18) and the cogging torque generated between the block (16) and the rotor (18) can be completely canceled out, and the cogging torque of the rotary electrical machine (10) can be reduced.

In the above-described stator (12), the number of the crimping positions (48) formed in one of the blocks (14) may differ from the number of crimping positions (50) formed in another of the blocks (16). As a result, the cogging torque generated between the block (14) and the rotor (18) and the cogging torque generated between the block (16) and the rotor (18) are canceled out with each other, whereby the cogging torque of the rotary electrical machine (10) overall can be reduced.

In a block (14, 16) of a stator (12) formed by integrating laminated steel plates by crimping, the block (14, 16) is formed such that a crimping position (48, 50) is offset with respect to a symmetry line of a shape of the block (14, 16) when the block (14, 16) is viewed from an axial direction of the stator (12). As a result, shapes of the block (14) and the block (16) can be made the same, hence the steel plates forming the block (14) and the block (16) can be punched by the same die.

A stator (12) includes the above-described block (14, 16) of a stator (12), and is formed by inverting one of the blocks (16) with respect to another of the blocks (14) and thereafter overlaying a plurality of the blocks (14, 16) in the axial direction. As a result, the stator (12) can be formed by the same-shaped block (14) and block (16).

A rotary electrical machine (10) includes the above-described stator (12). As a result, the cogging torque generated between the block (14) and the rotor (18) and the cogging torque generated between the block (16) and the rotor (18) can be completely canceled out, and the cogging torque of the rotary electrical machine (10) can be reduced.

The present invention is not particularly limited to the embodiment described above, and various modifications are possible without departing from the essence and gist of the present invention.

What is claimed is:

1. A stator comprising blocks formed by integrating laminated steel plates by crimping, wherein:
   the stator is formed by overlaying a plurality of the blocks in an axial direction of the stator; and
   the stator is formed so that in a plane that a pair of the blocks face each other, at least one crimping position of one of the blocks and a crimping position of another of the blocks do not overlap with each other, when the stator is viewed from the axial direction,
   a number of the crimping positions formed in one of the blocks is equal to a number of the crimping positions formed in another of the blocks; and
   the stator is formed so that in a plane that a pair of the blocks face each other, and when a number of magnetic poles of a rotor is assumed to be n, the crimping position of the one of the blocks is offset by 360/2n [° ] around a rotary axis of the rotor with respect to the crimping position of the other of the blocks, when the stator is viewed from the axial direction.

2. The stator according to claim 1, wherein a number of the crimping positions formed in one of the blocks differs from a number of the crimping positions formed in another of the blocks.

3. A rotary electrical machine including the stator according to claim 1.

* * * * *